US012614143B2

(12) United States Patent
Lawler, Jr.

(10) Patent No.: US 12,614,143 B2
(45) Date of Patent: **\*Apr. 28, 2026**

(54) FLEXIBLE TIME-TEMPERATURE SENSING LABEL SYSTEM

(71) Applicant: Copeland Cold Chain LP, Kennesaw, GA (US)

(72) Inventor: Casimir E. Lawler, Jr., Boise, ID (US)

(73) Assignee: Copeland Cold Chain LP, Kennesaw, GA (US)

( \* ) Notice: Subject to any disclaimer, the term of this patent is extended or adjusted under 35 U.S.C. 154(b) by 564 days.

This patent is subject to a terminal disclaimer.

(21) Appl. No.: 18/173,411

(22) Filed: Feb. 23, 2023

(65) Prior Publication Data

US 2023/0196261 A1 Jun. 22, 2023

Related U.S. Application Data

(63) Continuation of application No. 16/420,758, filed on May 23, 2019, now Pat. No. 11,615,367.

(Continued)

(51) Int. Cl.
G06Q 10/0832 (2023.01)
G01K 3/04 (2006.01)
(Continued)

(52) U.S. Cl.
CPC ........... G06Q 10/0832 (2013.01); G01K 3/04 (2013.01); G01K 7/021 (2013.01); G01K 11/12 (2013.01);
(Continued)

(58) Field of Classification Search
CPC .. G06Q 10/0832; G06Q 10/0833; G01K 3/04; G01K 7/021; G01K 11/12; G06K 19/06046; G06K 19/0717; G09F 3/0291
See application file for complete search history.

(56) References Cited

U.S. PATENT DOCUMENTS

| | | | | |
|---|---|---|---|---|
| 4,643,588 A | \* | 2/1987 | Postle | G01K 11/06 |
| | | | | 422/417 |
| 4,859,360 A | \* | 8/1989 | Suzuki | G01K 11/165 |
| | | | | 374/162 |

(Continued)

FOREIGN PATENT DOCUMENTS

| | | |
|---|---|---|
| CN | 101044061 A | 9/2007 |
| CN | 104428644 A | 3/2015 |

(Continued)

OTHER PUBLICATIONS

International Search Report regarding International Application No. PCT/US2019/034005, dated Sep. 10, 2019.

(Continued)

*Primary Examiner* — Nathaniel T Woodward
*Assistant Examiner* — Philip L Cotey
(74) *Attorney, Agent, or Firm* — Harness, Dickey & Pierce, P.L.C.

(57) ABSTRACT

A flexible sensor label including a reservoir chamber configured to store an activation medium, a plurality of first chambers, and a plurality of second chambers. Each first chamber has an associated first temperature and stores an irreversible thermochromic polymer that is altered and irreversibly changes color in response to the activation medium being released and coming into contact with the irreversible thermochromic polymer in the first chamber and an environmental temperature of the flexible sensor label corresponding to the associated first temperature of the first chamber. Each second chamber has an associated second temperature and stores a reversible thermochromic polymer that is altered and reversibly changes color in response to the activation medium being released and coming into contact with the reversible thermochromic polymer in the second chamber and the environmental temperature of the flexible (Continued)

sensor label corresponding to the associated second temperature of the second chamber.

17 Claims, 8 Drawing Sheets

Related U.S. Application Data

(60) Provisional application No. 62/676,022, filed on May 24, 2018.

(51) Int. Cl.

| | |
|---|---|
| *G01K 7/02* | (2021.01) |
| *G01K 11/12* | (2021.01) |
| *G06K 19/06* | (2006.01) |
| *G06K 19/07* | (2006.01) |
| *G06Q 10/0833* | (2023.01) |
| *G09F 3/00* | (2006.01) |

(52) U.S. Cl.
CPC ... *G06K 19/06046* (2013.01); *G06K 19/0717* (2013.01); *G06Q 10/0833* (2013.01); *G09F 3/0291* (2013.01)

(56) References Cited

U.S. PATENT DOCUMENTS

| | | | | | |
|---|---|---|---|---|---|
| 5,368,905 | A * | 11/1994 | Ohno | G01K 3/04 | 374/E11.006 |
| 5,709,472 | A * | 1/1998 | Prusik | G01K 3/04 | 374/150 |
| 5,738,442 | A * | 4/1998 | Paron | G01K 11/165 | 374/150 |
| 6,544,925 | B1 * | 4/2003 | Prusik | G01N 31/229 | 503/201 |
| 7,276,277 | B2 * | 10/2007 | Artmann | G01K 7/028 | 438/54 |
| 7,294,379 | B2 * | 11/2007 | Ko | G01K 3/04 | 368/327 |
| 7,514,262 | B2 * | 4/2009 | Ribi | G01N 31/229 | 436/1 |
| 8,115,182 | B1 * | 2/2012 | Patel | G01T 1/06 | 250/484.5 |
| 9,145,514 | B2 * | 9/2015 | Shirase | G01K 11/12 | |
| 11,615,367 | B2 * | 3/2023 | Lawler, Jr. | G06Q 10/0833 | 705/333 |
| 2004/0147852 | A1 * | 7/2004 | Brister | A61B 5/015 | 600/549 |
| 2005/0139142 | A1 * | 6/2005 | Kelley | B60C 13/001 | 116/34 A |
| 2005/0188910 | A1 * | 9/2005 | McCorkle | G01K 11/12 | 374/E11.018 |
| 2006/0291533 | A1 * | 12/2006 | Faries | A61J 1/1462 | 374/E11.018 |
| 2007/0251912 | A1 * | 11/2007 | Sixou | B65D 79/02 | 264/239 |
| 2008/0056329 | A1 * | 3/2008 | Smith | G01K 11/06 | 374/E11.006 |
| 2008/0072813 | A1 * | 3/2008 | Parker | G01K 11/18 | 116/216 |
| 2012/0027045 | A1 * | 2/2012 | McLellan | G01K 11/06 | 374/161 |
| 2013/0014690 | A1 * | 1/2013 | Shirase | C09K 9/02 | 116/207 |
| 2013/0068155 | A1 * | 3/2013 | Patel | G01K 11/12 | 116/216 |
| 2013/0287059 | A1 * | 10/2013 | Selman | G01K 3/04 | 374/102 |
| 2017/0169738 | A1 * | 6/2017 | David | G06Q 10/0832 | |
| 2017/0229000 | A1 * | 8/2017 | Law | G01K 3/04 | |
| 2023/0196261 | A1 * | 6/2023 | Lawler, Jr. | G06K 19/06018 | 705/333 |

FOREIGN PATENT DOCUMENTS

| | | |
|---|---|---|
| CN | 107710234 A | 2/2018 |
| CN | 107851173 A | 3/2018 |
| JP | H07103829 A | 4/1995 |
| JP | 2007525664 A | 9/2007 |
| KR | 200229726 Y1 | 7/2001 |
| WO | WO-03077227 A2 | 9/2003 |
| WO | WO-2017203850 A1 | 11/2017 |

OTHER PUBLICATIONS

Written Opinion regarding International Application No. PCT/US2019/034005, dated Sep. 10, 2019.

Extended European Search Report regarding Application No. 21167427.0 dated Sep. 16, 2021.

Extended European Search Report regarding Application No. 19807549.1 dated Feb. 8, 2022.

Non-Final Office Action regarding U.S. Appl. No. 16/420,758 dated Jul. 7, 2022.

First Office Action regarding Chinese Patent Application No. 201980049255.8, dated Nov. 14, 2022. Translation provided by Unitalen Attorneys at Law.

Second Office Action regarding Chinese Patent Application No. 201980049255.8, dated Jun. 29, 2023. Translation provided by Unitalen Attorneys at Law.

* cited by examiner

FLEXIBLE TIME-TEMPERATURE SENSING LABEL SYSTEM

CROSS-REFERENCE TO RELATED APPLICATIONS

This application is a continuation of U.S. application Ser. No. 16/420,758, filed May 23, 2019, which application claims the benefit of U.S. Provisional Application 62/676, 022, filed on May 24, 2018. The entire disclosure of the above application is incorporated herein by reference.

FIELD

The present disclosure relates to a product supply chain monitoring system, including a flexible sensor label to track the exposure of a shipment to a condition.

BACKGROUND

Applications in food, chemical, and pharmaceutical supply chains exist for tracking items as well as the condition of the items. Product supply chains include vaccines, tissue samples, blood bags, chemicals, cosmetics, chocolates, fine wine, and genetically modified organism produce. In each of these cases, however, there is a need to track the products from bench to patient, precursors to product, and farm to fork, or bacteria to border.

In all cases, the environment of shipments affects the contents of the shipment. For example, prolonged exposure to extreme temperatures, humidity, even excessive or exaggerated movements, including dropping or shaking of a product, can affect the shelf life of the product. Challenges exist with respect to monitoring exposure of the product to predetermined conditions at each stage of the supply chain to determine if the product has been compromised or to analyze the transportation path of the product.

The food supply chain has many points of entry and distribution, along with many people involved in the process. Both food safety and the ability to track the path of a food product from origin to destination are critical to those delivering products to consumers. As such, many companies have developed and introduced products and services around monitoring the temperature and identity of a food product along the food supply chain.

The need to monitor and track products in the supply chain extends beyond food. Monitoring and tracking is also needed in the pharmaceutical, chemical, semiconductor, cosmetic, and other industries, and may be used for quality, safety, and warranty applications. In some situations, a simple color changing sticker of temperature sensitive material is sufficient, but does not provide temperature history for analysis and supply chain improvements. In other cases, the digital accuracy and consistency of an electronic solution is needed, but the form factor is too rigid or heavy to ride with the product or adhere to the package or container. Applications in the food, chemical, and pharmaceutical supply chains abound in which both digital functionality, accuracy, and repeatability, as well as a flexible form factor are needed, including the tracking and monitoring of fine wine, blood bags, and semiconductor manufacturing chemicals in a variety of containers.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A flexible sensor label including a reservoir chamber configured to store an activation medium. The flexible sensor label includes an irreversible chamber configured to store a first indicator medium. The first indicator medium is altered in response to the activation medium being released and the flexible sensor label being exposed to a first condition associated with the first indicator medium. The flexible sensor label includes a reversible chamber configured to store a second indicator medium. The second indicator medium is altered in response to the activation medium being released and the flexible sensor label being exposed to a second condition associated with the second indicator medium.

A flexible sensor graph including a reservoir chamber configured to store a reagent. The flexible sensor graph includes a grid having a set of rows and a set of columns. The grid is configured to store a respective base reactant at each intersection of each row of the set of rows and each column of the set of columns. Each row of the set of rows corresponds to a respective predetermined temperature value and the respective base reactant stored within each row of the set of rows corresponds to the respective predetermined temperature value of the respective row of each intersection. Each column of the set of columns corresponds to a respective predetermined time and the respective base reactant stored within each column of the set of columns has a characteristic corresponding to the respective predetermined time of the respective column of each intersection.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
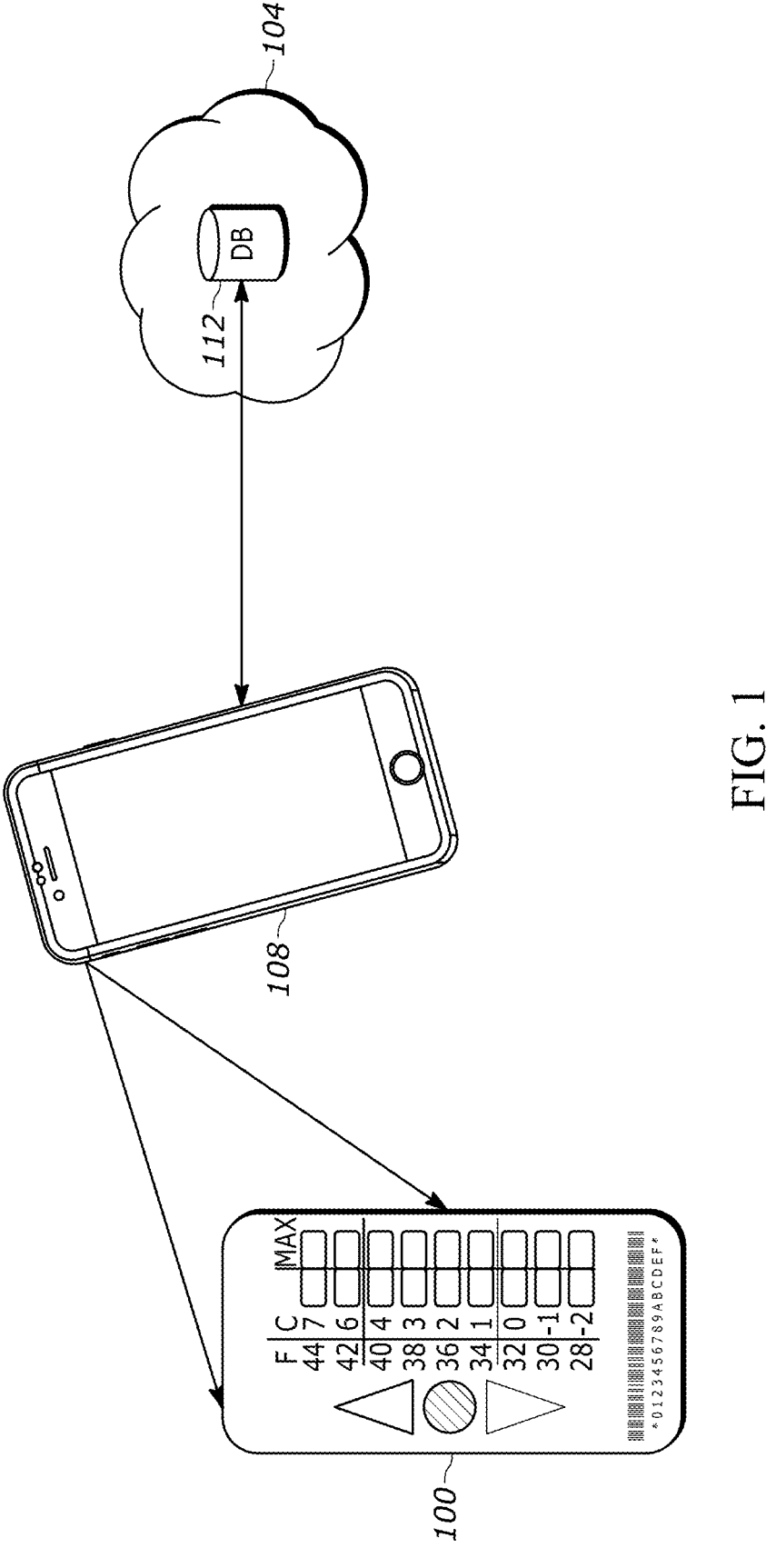
FIG. 1 is an example implementation of a flexible sensor label communicating with a remote location.

To monitor the conditions a shipment or containers within the shipment experience, a flexible sensor label monitors a condition that the shipment is exposed to as well as the amount of exposure. In various implementations, the flexible sensor label monitors temperature exposure of the shipment. For example, the flexible sensor label includes a first column of separated chambers. Each chamber corresponds with a different temperature, and each chamber is filled with an indicator medium. The indicator medium included in each chamber depends on the condition being measured, for example, a thermochromic ink may be used to monitor temperature.

In various implementations, the indicator medium is altered in response to being exposed to the condition. For example, when the condition is exceeding a maximum temperature threshold, the indicator medium may change color in response to the maximum temperature threshold being exceeded. Additionally, when the condition is falling below a minimum temperature threshold, the indicator medium may change color in response to experiencing the temperature falling below the minimum temperature threshold. In this way, when a maximum temperature threshold and a minimum temperature threshold are exceeded, a temperature range may be indicated as a present temperature.

The indicator medium can be a thermochromic ink that irreversibly changes color in response to being exposed to the corresponding condition. In various implementations, in addition to the first column of separated chambers that contain a reversible indicator medium, the flexible sensor label also includes a second column with separated chambers that include an irreversible indicator medium. In this way, the second column tracks a history of the exposure of the shipment to the condition that corresponds with the irreversible indicator medium as well as monitor the present condition that shipment is being exposed to using the first column of reversible indicator mediums.

In various implementations, the flexible sensor label is a thin, flexible sensor and display system that graphically presents collected information when queried or as the information is being collected. Various implementations include displays generated using a time-limited, environmentally sensitive, colloidal polymer changing material, or an electrochromic display activated by a microcontroller through a series of conductors. The flexible sensor label may also include memory and a wired or wireless method of retrieving data along with a graphical presentation.

The flexible sensor label is designed for any market needing a quick, convenient visual indication of status or condition with optional logging capabilities, in a thin, flexible form factor. The implementations of the flexible sensor label can take on a spectrum of functionalities, including a variable amount of data retention whether a chemical or electronic sensor. These graphing sensor systems may also be used to monitor the temperature status of equipment such as the scroll head of a compressor, the temperature of a curved tank, or the temperature of a pipe.

Flexible conductors have been demonstrated by many both as printed metals on a PET substrate, and as a standard etched flex circuit. The colloidal polymer used in a non-digital embodiment has been demonstrated by a number of suppliers.

Referring to FIG. 1, an example implementation of a flexible sensor label 100 communicating with a remote location, specifically, a cloud network 104 is shown. To track and store conditions that shipments have been exposed to, a mobile computing device 108, such as a phone, tablet, etc., can capture an image of the flexible sensor label 100 and identify the flexible sensor label 100 by a unique identifier (ID) included on the flexible sensor label 100. The image of the flexible sensor label 100 may also be uploaded to the cloud network 104 and stored in a database 112. From the image, the exposure of the corresponding shipment can be extracted and stored in the database 112.

The mobile computing device 108 can perform image recognition on the image to identify the conditions the flexible sensor label 100 has been exposed to as well as the unique ID of the flexible sensor label 100. In various implementations, the mobile computing device 108 can simply capture the image and send the image to the cloud network 104, for example, using a Wi-Fi connection. Then, additional processing of the image can be performed by remote computing devices accessing the database 112 from the cloud network 104.

In addition to capturing the image, the mobile computing device 108 can also transmit a current location of the mobile computing device 108 when the mobile computing device 108 is capturing the image of the flexible sensor label 100. The current location of the mobile computing device 108 is also transmitted with the captured image to the cloud network 104 and stored in the database 112. Storing the current location with the image indicating what conditions the flexible sensor label 100 has been exposed to provides monitoring of the shipment during an entire delivery cycle, from an origin location to a destination location.

In various implementations, the flexible sensor label 100 may be produced with a roll-to-roll manufacturing process using printed and flexible electronics. The use of particular components and mass production technique may provide for a high-volume, consistent, and accurate digital product at a lower per-part cost, compared to a standard pick-and-place electronic production. Additional implementations of a flexible sensor label are described below, for example, a colloidal polymer and similar variations.

Figure 2B:
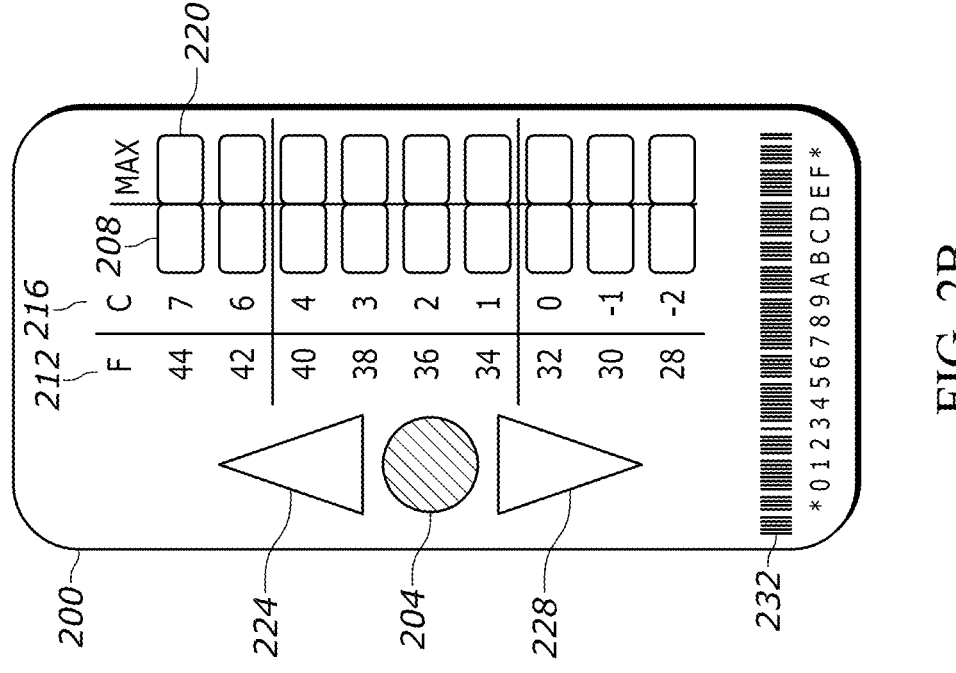
FIG. 2B is an example implementation of an activated flexible sensor label.
Figure 2A:
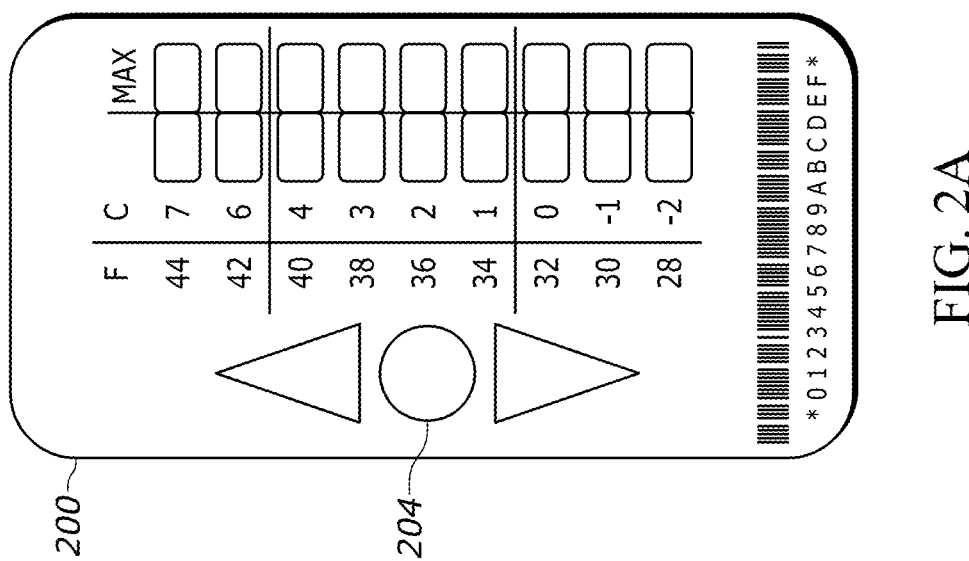
FIG. 2A is an example implementation of an inactivated flexible sensor label.

FIG. 2A is an example implementation of a flexible sensor label 200 in an inactive state. Flexible sensor label 200 includes an activation button 204. In various implementations, the activation button 204 is a reservoir including an activation medium. For example, the activation button 204 may be in a dome shape. The activation button 204 can be depressed or crushed to break the reservoir of the activation medium or indicator dye included in the reservoir. For example, the activation medium may be an irreversible thermochromic dye. The activation button 204 may release, in response to the reservoir being crushed, the activation medium to mix with other mediums included in additional chambers on the flexible sensor label 200. In this way, when the activation button 204 is pressed, indicators included on the flexible sensor label 200 may change in accordance with the flexible sensor label 200 experiencing corresponding conditions.

FIG. 2B is a graphical representation of an example implementation of the flexible sensor label 200 in an activated state. The activation button 204 turned, for example, black in response to being crushed. As mentioned above, a thermochromic ink mix is held in the activation button 204 to irreversibly turn the activation button 204 black and activate the flexible sensor label 200.

Indicators included on the flexible sensor label 200 may include a first column of reversible chambers, for example, a first reversible chamber 208. Each reversible chamber in the first column has a corresponding condition. While the disclosure of the present application includes temperature as the example condition that the flexible sensor label 200 monitors the flexible sensor label 200 may monitor or change according to other conditions, such as humidity, light, a material (for example, exposure to a gas or a bacteria), etc. In various implementations, a printed liquid crystal area may be included in place of the first column of reversible chambers. In this way, a printed sensor material may be used to identify the corresponding condition, which may not require a reservoir or chamber.

As shown in FIGS. 2A and 2B, each reversible chamber in the first column has a corresponding temperature in Fahrenheit column 212 and Celsius column 216. Once the activation button 204 has been depressed, as shown in FIG. 2B, the reversible chamber may change according to the temperature in the present environment. In various implementations, the reversible chambers represent the present temperature using a temperature sensitive liquid crystal (LC) thermometer.

The first reversible chamber 208 has a corresponding temperature represented in the Fahrenheit column 212 and the Celsius column 216. After the activation button 204 has been activated, the first reversible chamber 208 will change colors, for example, darken, when the present temperature of the flexible sensor label 200 is the corresponding temperature listed in the Fahrenheit column 212 and the Celsius column 216. Each reversible chamber below the first reversible chamber 208 has a corresponding temperature and changes color when the flexible sensor label 200 is experiencing that temperature.

In various implementations, each reversible chamber may be constructed of layering column chambers of leuco dyes over a similar column pattern of color, for example, yellow, that is different from the flexible sensor label 200 background as well as different from either color state of the leuco dye, and one color state of the leuco dye is a translucent color. In this situation, each grid element is made of two layers of leuco dye, one of ascending temperature change and one of descending temperature change, whose reaction temperatures are on either side of the target temperature indicated by the corresponding temperature listed in the Fahrenheit column 212 and the Celsius column 216.

For example, over a base print of yellow for a column chamber of 36° F., one layer of leuco dye would be translucent red until the temperature drops below 35° F., when the leuco dye becomes purple, while the other layer of leuco dye is translucent red until the temperature exceeds 37° F., when the leuco dye turns purple. In this scenario, when a column chamber is within the corresponding temperature range, the chamber appears orange, otherwise it appears a muddy dark color. In various implementations, other color combination are possible, including a white base, and a clear/dark blue leuco dye. In this example, the base column chambers may be white, while the surrounding color may be close to the dark blue of the out-of-range leuco dye, making the specific, in-range temperature chamber easier to identify.

In various implementations, the present temperature may be indicated by altering the polymer chain of the leuco dye such that each chain has an upper and lower reaction segment. That is, the reacted state of either segment changes the appearance of the leuco dye slightly, and when both are in the reacted state, the effect of the appearance change is greater. For example, if the polymer chain is designed with one darkening reactive segment to temperatures below a first set point (for example, 37° F.) and another darkening reactive segment to temperatures above a second, lower set point (for example, 35° F.), then the leuco dye will be darkest when the temperature experienced is between the two set points, where the darkest condition is notably darker than when the leuco dye is outside of that temperature range. This transition of dark may also be between two colors such as clear and blue, such that nominally, outside of the specified range, the column chambers would appear light blue. In this situation, the column chambers may be printed on a light blue background to allow the transition to darker blue be more pronounced. For some leuco dyes, a change may be reversible or irreversible, depending on the acidity level of the reagent included in the dye suspension. Similarly, this particular leuco dye reaction may be made reversible or irreversible.

The flexible sensor label 200 also includes a second column of irreversible chambers, for example, a first irreversible chamber 220. In various implementations, the irreversible chambers include time delay irreversible leuco dyes. For example, each irreversible chamber may include an above temperature indication and a below temperature indication. The second column indicates the temperature experienced by the flexible sensor label 200, and the irreversible leuco dye has a reaction temperature based around a desired temperature of the shipment being monitored. For example, a product included in the shipment may be used to determine the desired temperature of the shipment based on the desired temperature of the product. The number of temperatures included in Fahrenheit column 212 and the Celsius column 216 can range from a highest desired temperature (for example, 40° F.) to be experienced to a lowest desired temperature (for example, 30° F.) to be experienced.

In such a configuration, both ascending and descending temperature sensitive materials would be used. For example, if the temperature range being monitored is constructed of leuco dye column chambers in separations of 2° F., as shown in the Fahrenheit column 212 of FIG. 2B, half of these column chambers may include descending temperature sensitive leuco dye activated when the temperature drops below the corresponding set points (for example, 34° F., 32° F., and 30° F.), while the other half may include ascending temperature sensitive leuco dye activated when the temperature rises above the corresponding set points (for example, 36° F., 38° F., and 40° F.). In various implementations, the leuco dyes are designed with solvents that change state (to permit a color change) over some time interval, such as 15 to 20 minutes.

The flexible sensor label 200 also includes an upper limit indicator 224 and a lower limit indicator 228. Similar to the first irreversible chamber 220, once activated, the upper limit indicator 224 and the lower limit indicator 228 will permanently change color when the temperature experienced by the flexible sensor label 200 exceeds the designed limits of the respective leuco dyes, preferably with a longer delay than designed into the leuco dyes used to display the temperature experienced. For example, the longer delay may be 30 to 40 minutes. This configuration implies that the label must be at the center temperature (here 35F) at the time the reservoir of activation medium of the activation button 204 is broken, thereby releasing the activation medium into the irreversible leuco dyes.

Additionally, the flexible sensor label 200 may also include a unique ID 232. For example, the unique ID may take the form of a printed or etched code, such as a QR, 2D, bar code, a radio frequency identification (RFID) tag, or a combination thereof, to track the flexible sensor label 200 and eventually the shipment. As explained with respect to FIG. 1, the flexible sensor label 200 may be captured with a mobile computing device at each point of transportation and the image of the flexible sensor label 200 may be uploaded to the cloud network. The unique ID 232 identifies the flexible sensor label 200 as well as the shipment and the product within the container to which the flexible sensor label 200 is affixed. For example, the flexible sensor label 200 may be adhered to a shipment or packaging of a product using an adhesive material. Tracked information may be arranged and stored according to the unique ID.

Figures 3A, 3B:
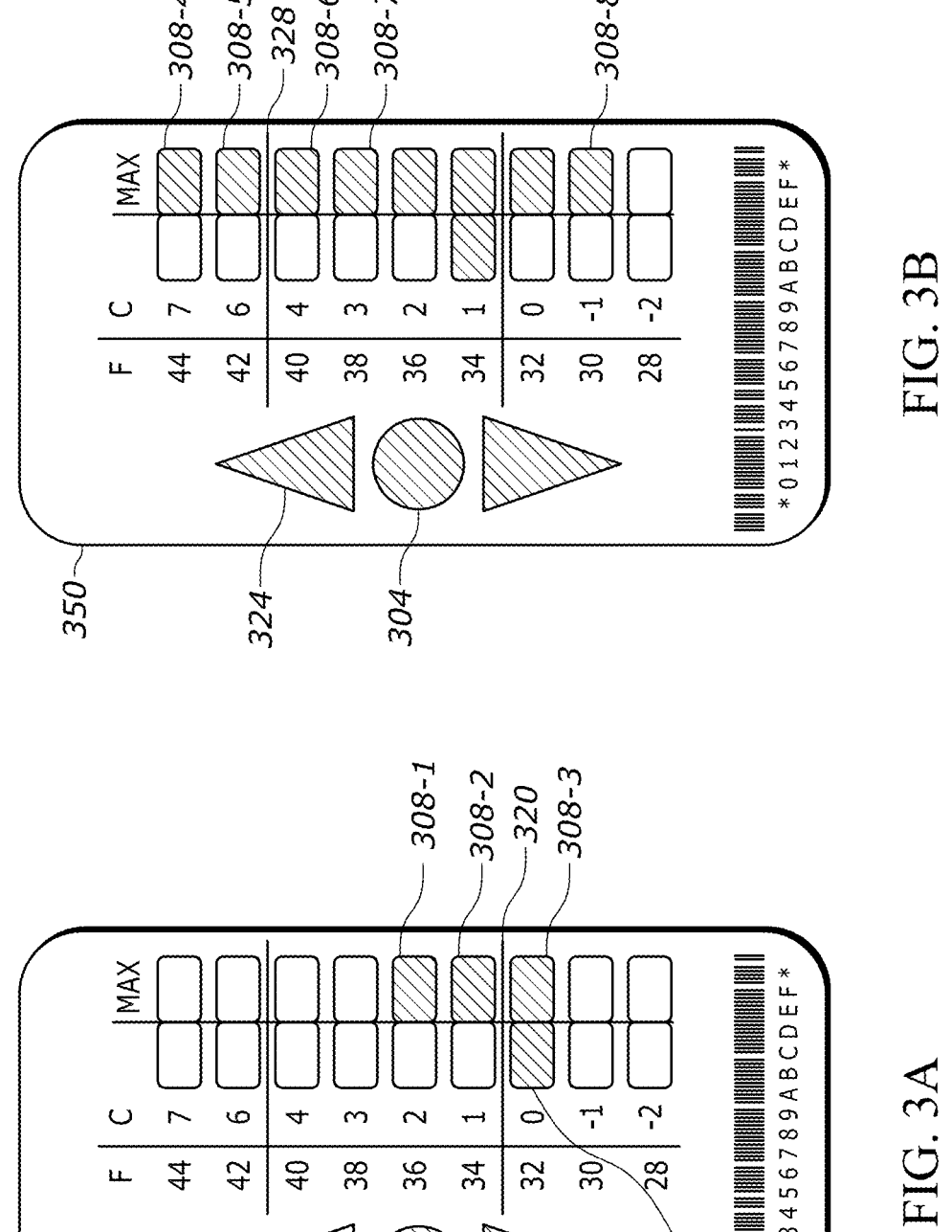
FIG. 3A is an example flexible sensor label at the early stages of distribution.
FIG. 3B is an example flexible sensor label once delivered to a distribution center.

Referring now to FIG. 3A, an example flexible sensor label 300 at the early stages of distribution is shown. For example, after the shipment has been shipped and the flexible sensor label 300 has been activated as indicated by an activation button 304 being a darker color, the flexible sensor label 300 displays which temperature the flexible sensor label 300 has been exposed to at 308-1, 308-2, and 308-3 as well as a present temperature 312. That is, the flexible sensor label 300 indicates that the flexible sensor label 300 has experienced temperatures ranging from 32° F. through 36° F. and the present temperature is 32° F.

Further, a lower limit indicator 316 is darkened, which indicates that the flexible sensor label 300 has been exposed to temperatures below a lower limit 320, for example, below 34° F., for an extended period of time. As mentioned previously, the extended period of time may be set at 30 to 40 minutes. For example, the leuco dye included in the lower limit indicator 316 irreversibly changes color in response to being exposed to a predetermined condition for the extended period of time, in the present example, being exposed to temperatures before 34° F. for at least 30 to 40 minutes.

FIG. 3B is the example flexible sensor label 300 once delivered to a distribution center. For example, once the flexible sensor label 300 has arrived at the distribution center, the flexible sensor label 300 is inspected and/or photographed and indicates that the flexible sensor label 300 has experienced additional temperatures as indicated by 308-4, 308-5, 308-6, 308-7, and 308-8. That is, the total range of experienced temperatures is 30° F. through 44° F. Additionally, an upper limit indicator 324 is darkened, indicating that an upper limit 328 temperature, in this case, above 40° F., was exceeded for the extended period.

Figure 4A:
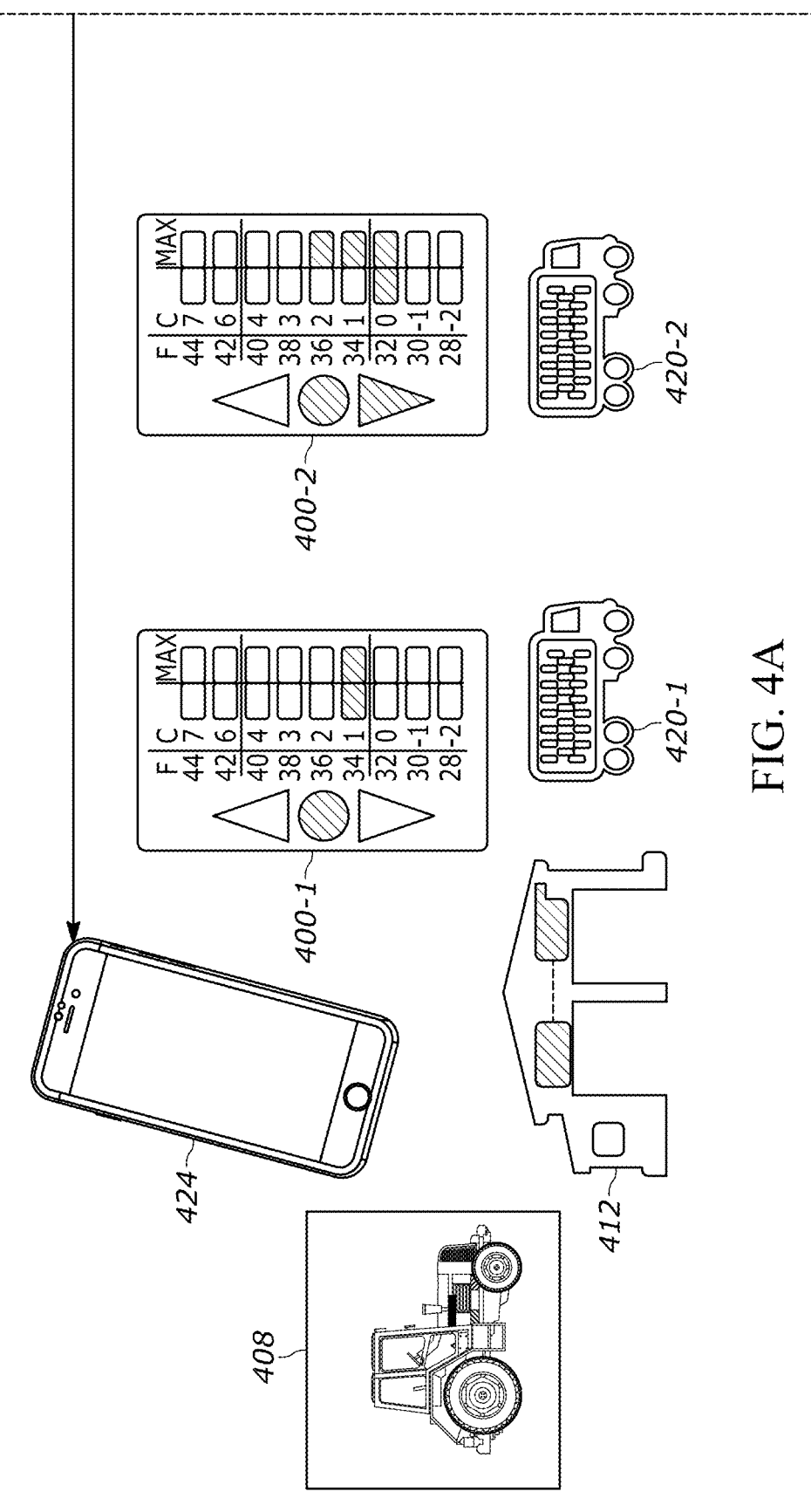
FIGS. 4A-4B are graphical representations of an example implementation of monitoring a flexible sensor label from storage to a distribution center.
Figure 4B:
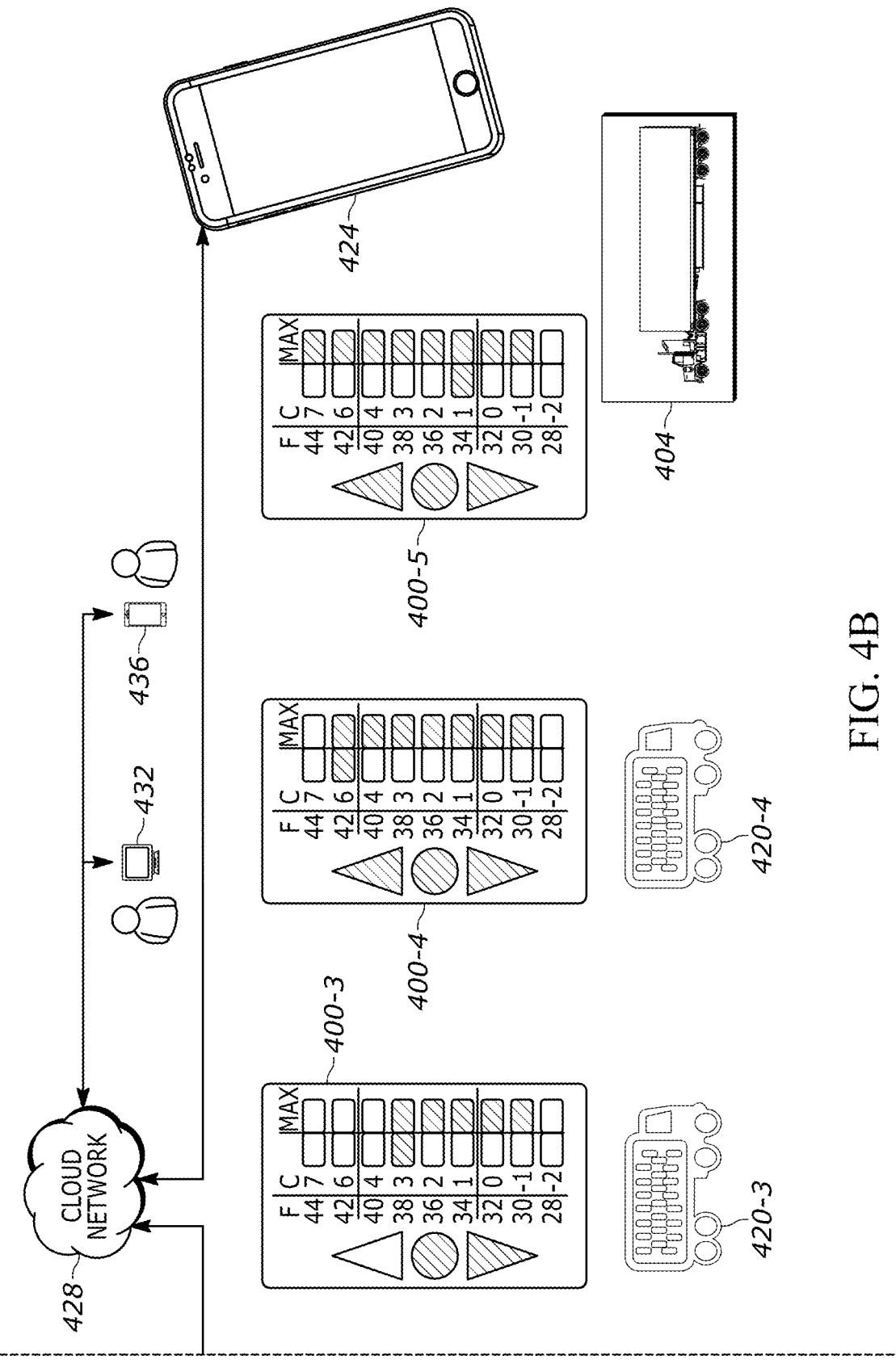

FIGS. 4A-4B are graphical representations of an example implementation of monitoring a flexible sensor label 400-1, 400-2, 400-3, 400-4, and 400-5, collectively 400, from storage to a distribution center 404. For example, after a product is removed from a field 408, the product may be stored in a storage facility 412, such as a shed. In various implementations, the product is then packaged and prepared for shipment. At this time, the flexible sensor label 400-1 may be affixed to the shipment, monitoring the product and the exposure of the product. Once placed, the flexible sensor label 400-1 is activated by pressing an activation button. The flexible sensor label 400-1 will indicate the present temperature in the first column of chambers and will indicate that the present temperature is an experienced temperature in the second column of chambers.

At each point along the transportation path 420-1, 420-2, 420-3, and 420-4, the flexible sensor label 400 is tracking temperature exposure of the shipment as well as the present temperature. At each point along the transportation path 420-1, 420-2, 420-3, and 420-4 and at the distribution center 404, the flexible sensor label 400 includes additional information about the temperature experienced. When the shipment is first shipped from the storage facility 412 and once the shipment arrives at the distribution center 404, a mobile computing device 424 may capture an image of the flexible sensor label 400. The mobile computing device 424, which may vary at each point along the transportation path, may capture an additional image at any point along the transportation path. Then, once captured, the images can be uploaded to a cloud network 428 via a network connection, for example, via WiFi. In various implementations, the image may be uploaded using a mobile application operated by the mobile computing device 424.

Once uploaded to the cloud network 428, an analysis computing device 432 may receive the uploaded information. The analysis computing device 432 may analyze and use the temperatures experienced to determine additional information about the shipment, including potential spoilage, shelf life, grading each shipment, etc. In various implementations, the analysis computing device 432 may generate reports and transmit the generated reports to the cloud network 428 or to a client device 436. For example, the client device 436 may receive alerts via e-mail or text message.

Figure 5:
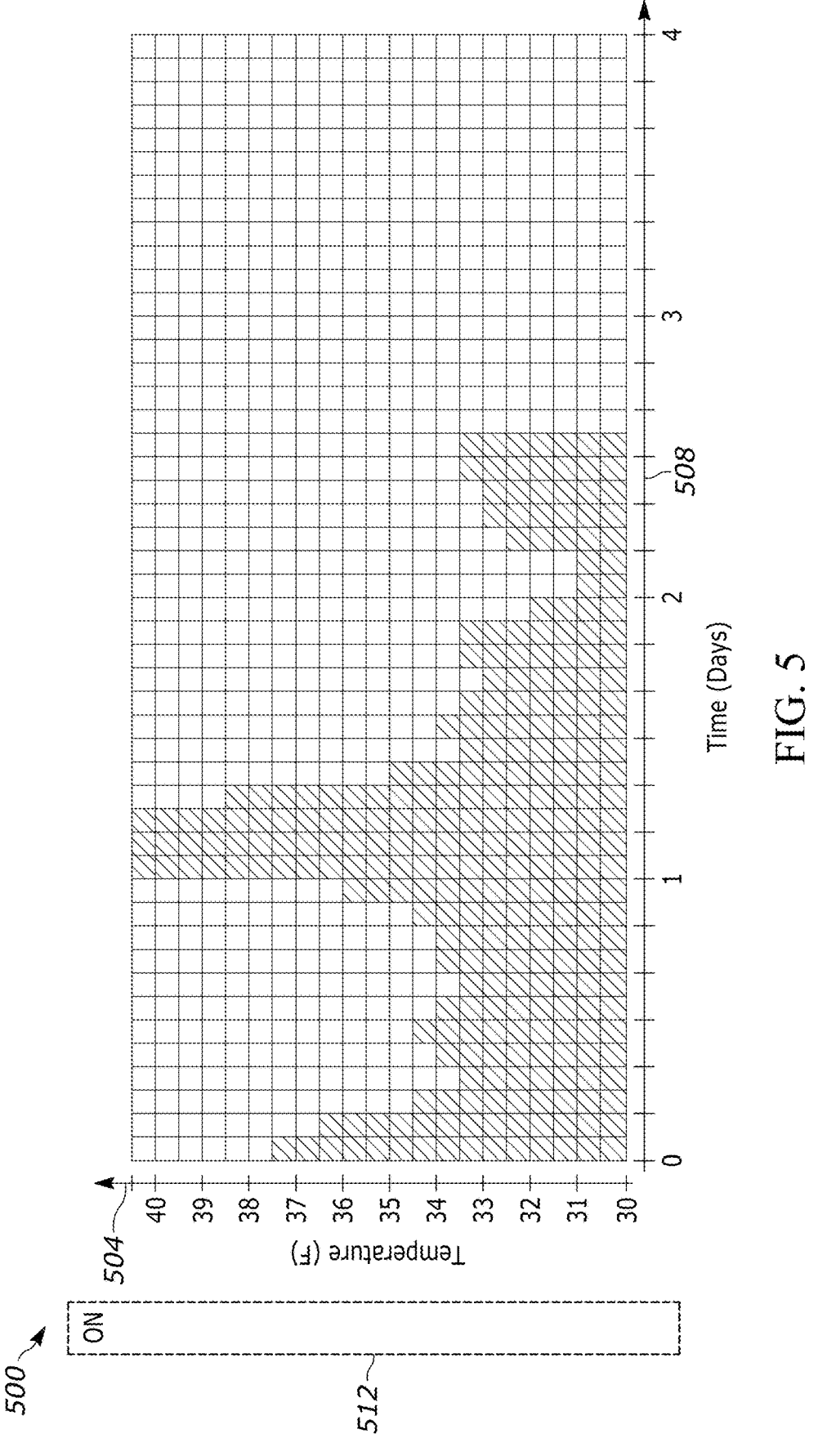
FIG. 5 is an example display of an activated colloidal polymer sensor label.

Referring now to FIG. 5, an example display of an activated colloidal polymer sensor label 500 is shown. In various implementations, the colloidal polymer sensor label 500 includes a sensor and display manufactured using printing techniques and a colloidal polymer that changes color over a predetermined period of exposure to temperature. The colloidal polymer also has a reagent that stops the color changing reaction after a predetermined period, as well as a reagent that prevents the color changing reaction from starting for a predetermined period. In various implementations, no battery or power source is needed.

The colloidal polymer sensor label 500 may include a grid of base reactant printed on a substrate, sandwiched two wicking overlays of polyester fibers. Each successive row of reactant is designed to be sensitive to a specific temperature range, as indicated on a printed vertical temperature scale 504. Each of these overlays may have fibers oriented in a horizontal direction of a time axis 508, with one end connected to a small reservoir 512 of reagent of particular viscosity. The viscosities of the reagents are consistent over the targeted temperature range of the sensor, and the reservoirs physically offset from each other by one time-unit square as depicted on the time axis 508.

Included on the surface of the colloidal polymer sensor label 500 may be human-readable or machine-readable information. Such machine-readable information may be in the form of text printing, a bar code, or a QR Code. Such information may include operating instructions, shipment type, an intended environmental use range, a product identifier, or a unique identifier, such as a serial number. The colloidal polymer sensor label 500 is started when the user breaks the separator between the reactant and reagent reservoirs and the respective wicks. The reagent closer to the reactant grid activates the temperature sensitive reaction, while the further reagent deactivates the color change reaction and prevents further change. The viscosity of reagents is such that the time it takes the reagents to wick is consistent with the time scale printed on the time axis 508. The net effect of this configuration is for a graph, such as the graph of FIG. 5, to display representing the maximum temperature range to which the colloidal polymer sensor label 500 is exposed over particular subsequent time intervals.

A row of marking agent, such as ink or a different reagent and reactant pair, separated by a membrane may also be added above the graph displayed on the colloidal polymer sensor label 500. If a user would like to identify a particular moment in time on the display, the user may break the membrane exposing the small encapsulated area to the ink or reacting agents such that the color of that marking area changes quickly. This area may be in the form of an arrow or triangle or other shape identifying a column of environmental information. In this way, the receiving user may mark the arrival of the colloidal polymer sensor label 500, or other notable event.

An application may also be written for a mobile device, such as a phone, or a mounted device, such as a security or inventory camera, that uses image capture to load the information from the device into the cloud database system for analysis and later display. In various implementations, the image system may interpret the information on the colloidal polymer sensor label 500, such as the serial number and temperature information during the use of the label, and send the information along with other environmental information, such as location of the image system, or other sensor information tied to the image system or network, to the cloud database system that further analyzes and stores the data for later retrieval. For example, the data may be stored as a comma separated values (CSV) file, temperature over time graph, or summary data such as average temperature or mean kinetic temperature (MKT).

The cloud database system or reader system, given the information collected, such as a shipment type printed or written on the colloidal polymer sensor label 500, comparative analysis may be performed to determine if an excursion has occurred sufficient to trigger an alert. Either the reader or cloud database system may then trigger an alert, such as a noise, light, text message, or email. For example, the alert may be transmitted to a mobile device of a client or a managing system.

Figure 6:
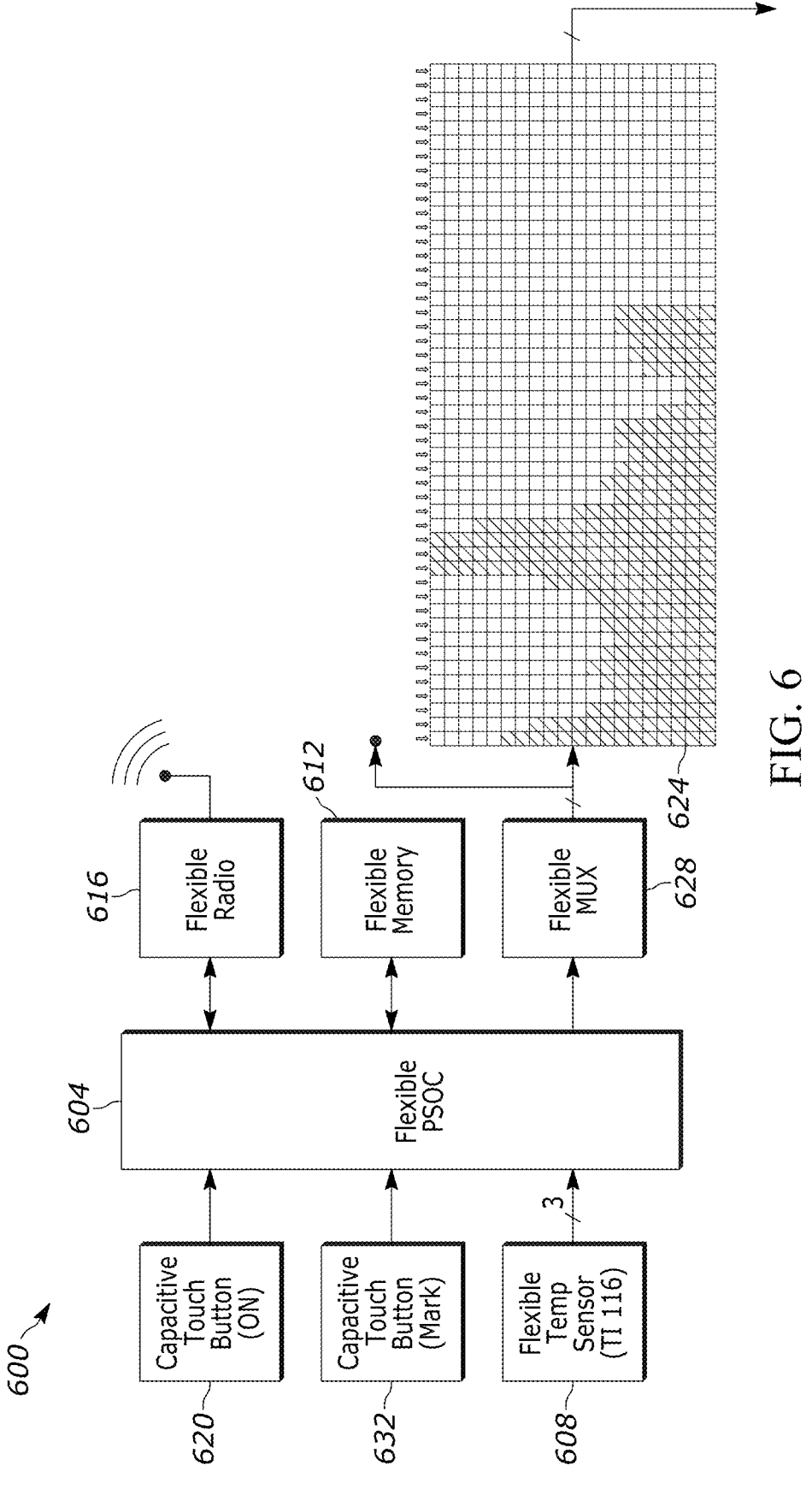
FIG. 6 is an example of a flexible hybrid sensor label.

FIG. 6 is an example of a flexible hybrid sensor label 600. While the flexible hybrid sensor label 600 is described, a hybrid sensor label may include standard electronic components on a flexible circuit. In various implementations, the flexible hybrid sensor label 600 includes printed and flexible electronics and is manufactured using printing and standard electronic manufacturing processes. For example, a near bi-stable electrochromic ink display may be driven by a standard semiconductor microcontroller or a flexible microcontroller 604, such as a programmable system on chip (PSOC), converted to a flexible semiconductor. The digital system of display and microcontroller is driven by a battery or other power source, such as scavenged energy.

In various implementations, the electrochromic material and actuation conductors are printed on a substrate, along with capacitively sensitive contacts for user input. On this substrate, or a parallel substrate in conductive connection, is mounted the flexible microcontroller 604. The flexible microcontroller 604 may be a PSOC with code memory, execution memory, a processor, and other peripherals and capabilities. For example, the flexible microcontroller 604 is used with capacitive touch input capability. An environmental sensor 608 is used by the flexible microcontroller 604 to monitor an environmental condition, such as temperature. The environmental sensor 608 may either be a part of the flexible microcontroller 604 or an external sensor. The functionality of this circuit and system may be expanded through additional components, including a flexible memory 612 for additional data logging and an RF circuit for non-contact communications, such as NFC, EPC, BTLE, or ISM band. For example, the flexible hybrid sensor label 600 includes a flexible radio 616 for non-contact communications.

The flexible hybrid sensor label 600 may be powered by a standard battery, such as a CR2032 battery, or a flexible battery. The flexible hybrid sensor label 600 may also use scavenged and stored scavenged energy, such as solar or RF. Included on the surface of the flexible hybrid sensor label 600 may be information that is either or both human readable or machine readable. Such machine-readable information may be in the form of text printing, a bar code, or a QR Code. Such information may include operating instructions, shipment type, an intended environmental use range, a product identifier, or a unique identifier, such as a serial number. This information, as well as other additional information may also be stored electronically within the flexible hybrid sensor label 600.

In various implementations, the user activates the flexible hybrid sensor label 600 by pressing the "On" button 620. Once activated, the flexible microcontroller 604 monitors the environmental condition, here temperature, and at regular intervals, activates pixels of an electrochromic display 624 (also shown in FIG. 7) that correspond to the appropriate temperature range and time interval.

In various implementations, the electrochromic display 624 remains blank until an input sensor, for example, the "On" button 620, is touched, at which time the flexible microcontroller 604 changes the state of the electrochromic material via a flexible MUX 628 to reflect the information stored in the label or retrieved from an outside source, such as a cloud-based data service through a nearby reader system. System functionality may be increased by adding a user input to "mark" the graph. Upon actuating a "Mark" button 632, the flexible microcontroller 604 activates the appropriate electrochromic indicator on the electrochromic display 624. In various implementations, the flexible hybrid sensor label 600 may also store the time and temperature data for later user retrieval via RF or contact means. As described above, an application may be written to retrieve the information from the sensor display label.

Figure 7:
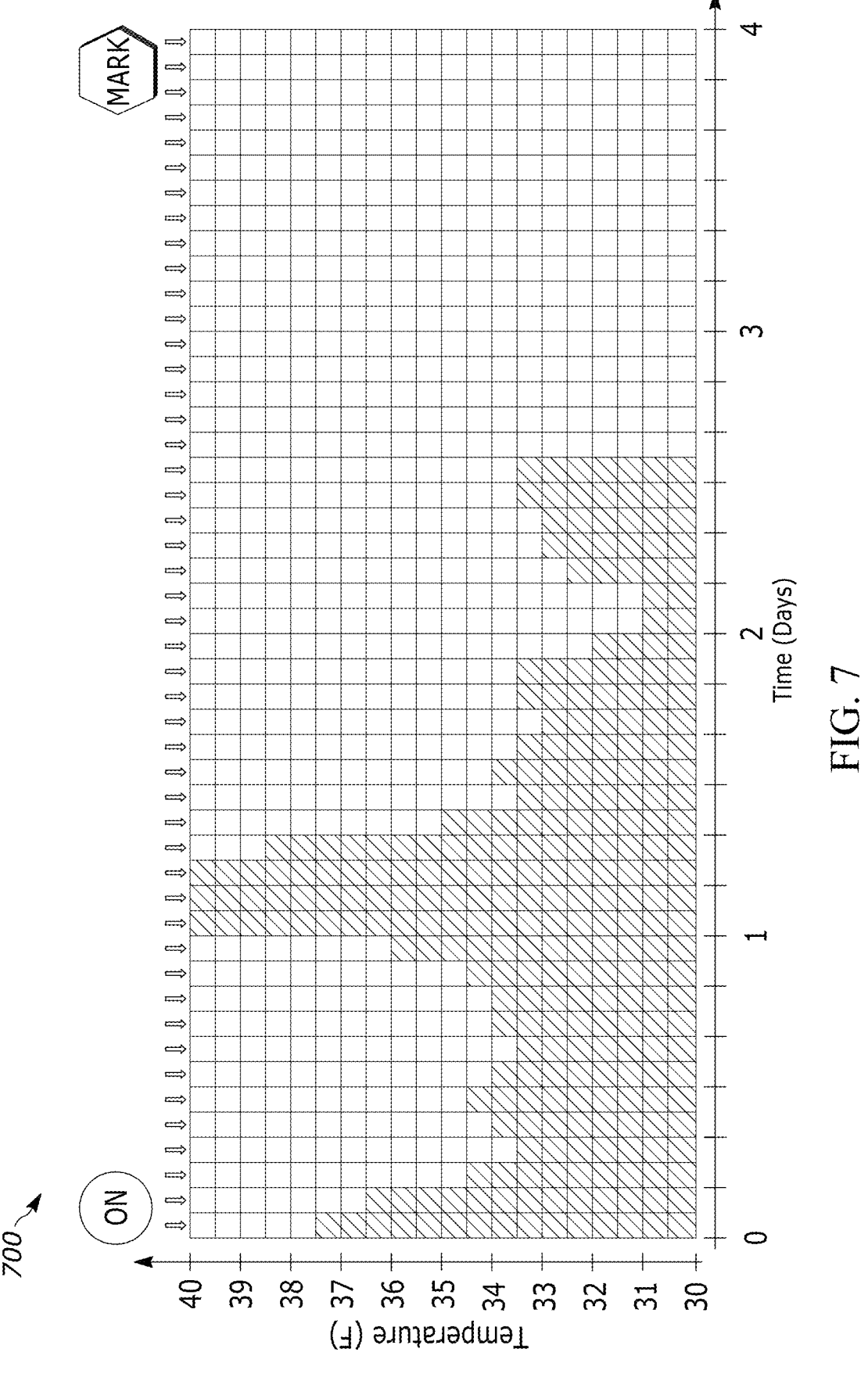
FIG. 7 is an example display of an activated flexible hybrid sensor label.

FIG. 7 is an example display of an activated flexible hybrid sensor label 700. The flexible hybrid sensor label may be implemented according to the example included in FIG. 6.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A flexible sensor label, comprising:

a reservoir chamber configured to store an activation medium;

a plurality of first chambers, each first chamber of the plurality of first chambers having an associated first temperature and storing an irreversible thermochromic polymer, wherein the irreversible thermochromic polymer is altered and irreversibly changes color in response to the activation medium being released and coming into contact with the irreversible thermochromic polymer in the first chamber and an environmental temperature of the flexible sensor label corresponding to the associated first temperature of the first chamber; and a plurality of second chambers, each second chamber of the plurality of second chambers having an associated second temperature and storing a reversible thermochromic polymer, wherein the reversible thermochromic polymer is altered and reversibly changes color in response to the activation medium being released and coming into contact with the reversible thermochromic polymer in the second chamber and the environmental temperature of the flexible sensor label corresponding to the associated second temperature of the second chamber.

2. The flexible sensor label of claim 1, wherein the plurality of first chambers and the plurality of second chambers are arranged on the flexible sensor label along a temperature axis indicating a plurality of temperatures such that each first chamber of the plurality of first chambers and each second chamber of the plurality of second chambers are located at a location along the temperature axis having a temperature indicator that corresponds to the associated first temperature of the first chamber and the associated second temperature of the second chamber.

3. The flexible sensor label of claim 1, further comprising:
an upper limit indicator chamber having an associated upper limit temperature and storing an additional irreversible thermochromic polymer, wherein the additional irreversible thermochromic polymer is altered and irreversibly changes color in response to the activation medium being released and coming into contact with the additional irreversible thermochromic polymer in the upper limit indicator chamber and the environmental temperature of the flexible sensor label exceeding the associated upper limit temperature of the upper limit indicator chamber.

4. The flexible sensor label of claim 1, further comprising:
a lower limit indicator chamber having an associated lower limit temperature and storing an additional irreversible thermochromic polymer, wherein the additional irreversible thermochromic polymer is altered and irreversibly changes color in response to the activation medium being released and coming into contact with the additional irreversible thermochromic polymer in the lower limit indicator chamber and the environmental temperature of the flexible sensor label dropping below the associated lower limit temperature of the lower limit indicator chamber.

5. The flexible sensor label of claim 1, further comprising:
an upper limit indicator chamber having an associated upper limit temperature and storing a first additional irreversible thermochromic polymer, wherein the first additional irreversible thermochromic polymer is altered and irreversibly changes color in response to the activation medium being released and coming into contact with the first additional irreversible thermochromic polymer in the upper limit indicator chamber and the environmental temperature of the flexible sensor label exceeding the associated upper limit temperature of the upper limit indicator chamber; and
a lower limit indicator chamber having an associated lower limit temperature and storing a second additional irreversible thermochromic polymer, wherein the second additional irreversible thermochromic polymer is altered and irreversibly changes color in response to the activation medium being released and coming into contact with the second additional irreversible thermochromic polymer in the lower limit indicator chamber and the environmental temperature of the flexible sensor label dropping below the associated lower limit temperature of the lower limit indicator chamber.

6. The flexible sensor label of claim 5, wherein:
for each second chamber of the plurality of second chambers, the reversible thermochromic polymer has a first delay time such that the reversible thermochromic polymer changes color after the environmental temperature of the flexible sensor label corresponds to the associated second temperature of the second chamber for longer than the first delay time;
the first additional irreversible thermochromic polymer has a second delay time such that the first additional irreversible thermochromic polymer changes color after the environmental temperature of the flexible sensor label exceeds the associated upper limit temperature of the upper limit indicator chamber for longer than the second delay time;
the second additional irreversible thermochromic polymer has a third delay time such that the second additional irreversible thermochromic polymer changes color after the environmental temperature of the flexible sensor label drops below the associated lower limit temperature of the lower limit indicator chamber for longer than the third delay time; and
the second and third delay times are longer than the first delay time.

7. The flexible sensor label of claim 1 wherein, for each second chamber of the plurality of second chambers, in response to the environmental temperature of the flexible sensor label no longer corresponding to the associated second temperature of the second chamber, the reversible thermochromic polymer stored in the second chamber changes color back to an original color of the reversible thermochromic polymer.

8. A method comprising:
capturing, with a mobile computing device, an image of a flexible sensor label having a unique identifier included on the flexible sensor label, the flexible sensor label including (i) a reservoir chamber configured to store an activation medium, (ii) a plurality of first chambers, each first chamber of the plurality of first chambers having an associated first temperature and storing an irreversible thermochromic polymer, wherein the irreversible thermochromic polymer is altered and irreversibly changes color in response to the activation medium being released and coming into contact with the irreversible thermochromic polymer in the first chamber and an environmental temperature of the flexible sensor label corresponding to the associated first temperature of the first chamber, and (iii) a plurality of second chambers, each second chamber of the plurality of second chambers having an associated second temperature and storing a reversible thermochromic polymer, wherein the reversible thermochromic polymer is altered and reversibly changes color in response to the activation medium being released and coming into contact with the reversible thermochromic polymer in the second chamber and the environmental temperature of the flexible sensor label corresponding to the associated second temperature of the second chamber; and
transmitting, with the mobile computing device, the image of the flexible sensor label to a cloud network that includes a database, wherein the database is configured to store the image of the flexible sensor label.

9. The method of claim 8, wherein the flexible sensor label is attached to a shipment container and temperature exposure information of the shipment container is extracted from the image of the flexible sensor label by a remote computing device configured to access the database via the cloud network.

10. The method of claim 8, wherein the flexible sensor label is attached to a shipment container, the method further comprising:

performing, with the mobile computing device, image recognition on the image of the flexible sensor label to extract temperature exposure information of the shipment container and the unique identifier of the flexible sensor label; and transmitting, with the mobile computing device, the temperature exposure information of the shipment container and the unique identifier of the flexible sensor label to the cloud network for storage in the database.

11. The method of claim 10, further comprising:

transmitting, with the mobile computing device, a location of the mobile computing device when the mobile computing device captured the image of a flexible sensor label to the cloud network for storage in the database with the temperature exposure information of the shipment container and the unique identifier of the flexible sensor label.

12. The method of claim 8, further comprising:

transmitting, with the mobile computing device, a location of the mobile computing device when the mobile computing device captured the image of a flexible sensor label to the cloud network for storage in the database with the image of the flexible sensor label.

13. A system comprising:

a flexible sensor label having a unique identifier included on the flexible sensor label, the flexible sensor label including (i) a reservoir chamber configured to store an activation medium, (ii) a plurality of first chambers, each first chamber of the plurality of first chambers having an associated first temperature and storing an irreversible thermochromic polymer, wherein the irreversible thermochromic polymer is altered and irreversibly changes color in response to the activation medium being released and coming into contact with the irreversible thermochromic polymer in the first chamber and an environmental temperature of the flexible sensor label corresponding to the associated first temperature of the first chamber, and (iii) a plurality of second chambers, each second chamber of the plurality of second chambers having an associated second temperature and storing a reversible thermochromic polymer, wherein the reversible thermochromic polymer is altered and reversibly changes color in response to the activation medium being released and coming into contact with the reversible thermochromic polymer in the second chamber and the environmental temperature of the flexible sensor label corresponding to the associated second temperature of the second chamber; and a mobile computing device in communication with a database via a cloud network, the mobile computing device being configured to capture an image of the flexible sensor label and transmit the image of the flexible sensor label to the database via the cloud network and the database being configured to store the image of the flexible sensor label.

14. The system of claim 13, wherein the flexible sensor label is attached to a shipment container and temperature exposure information of the shipment container is extracted from the image of the flexible sensor label by a remote computing device configured to access the database via the cloud network.

15. The system of claim 13, wherein the flexible sensor label is attached to a shipment container, the mobile computing device being further configured to perform image recognition on the image of the flexible sensor label to extract temperature exposure information of the shipment container and the unique identifier of the flexible sensor label and to transmit the temperature exposure information of the shipment container and the unique identifier of the flexible sensor label to the cloud network for storage in the database.

16. The system of claim 15, wherein the mobile computing device is further configured to transmit a location of the mobile computing device when the mobile computing device captured the image of a flexible sensor label to the cloud network for storage in the database with the temperature exposure information of the shipment container.

17. The system of claim 13, wherein the mobile computing device is further configured to transmit a location of the mobile computing device when the mobile computing device captured the image of a flexible sensor label to the cloud network for storage in the database with the image of the flexible sensor label.

* * * * *